(12) United States Patent
Hansen

(10) Patent No.: US 7,651,320 B2
(45) Date of Patent: Jan. 26, 2010

(54) METHOD OF LIGHTNING-PROOFING A BLADE FOR A WIND-ENERGY PLANT, A LIGHTNING-PROOFED BLADE AND A WIND-ENERGY PLANT COMPRISING SUCH BLADE

(75) Inventor: Lars Bo Hansen, Agerskov (DK)

(73) Assignee: LM Glasfiber A/S, Lunderskov (DK)

( * ) Notice: Subject to any disclaimer, the term of this patent is extended or adjusted under 35 U.S.C. 154(b) by 113 days.

(21) Appl. No.: 10/572,293

(22) PCT Filed: Sep. 10, 2004

(86) PCT No.: PCT/DK2004/000602

§ 371 (c)(1),
(2), (4) Date: May 11, 2006

(87) PCT Pub. No.: WO2005/026538

PCT Pub. Date: Mar. 24, 2005

(65) Prior Publication Data

US 2006/0280613 A1 Dec. 14, 2006

(30) Foreign Application Priority Data

Sep. 15, 2003 (DK) .............................. 2003 01329

(51) Int. Cl.
*F03D 11/00* (2006.01)
*H02G 13/00* (2006.01)

(52) U.S. Cl. .......................................... 416/1; 416/230

(58) Field of Classification Search ...................... 416/1, 416/146 R, 229, 230; 361/216, 218, 220
See application file for complete search history.

(56) References Cited

U.S. PATENT DOCUMENTS 3,923,421 A * 12/1975 Carter et al. ................. 416/224

4,502,092 A * 2/1985 Bannink et al. ............. 361/218
6,457,943 B1 * 10/2002 Olsen et al. ................. 416/230

FOREIGN PATENT DOCUMENTS

WO WO01/77527 A1 * 10/2001

* cited by examiner

*Primary Examiner*—Edward Look
*Assistant Examiner*—Nathaniel Wiehe
(74) *Attorney, Agent, or Firm*—Day Pitney LLP

(57) ABSTRACT

The invention relates to a method of lightning-proofing a blade (1) on a wind-energy plant, which blade comprises a blade shell (2) configured essentially as a fiber-reinforced laminate, which laminate comprises electrically conductive fibers, wherein the blade comprises at least one lightning arrester (9) configured for conducting lightning current, including preferably to ground. The method comprises that the electrically conductive fibers are connected to each other, and that at least one metallic receptor (4, 24, 25) is arranged for capturing lightning current at or in proximity of the external face of the blade; and that the receptor and the fibers are connected to the lightning arrester for equalizing the difference in potential between the lightning arrester and the electrically conductive fibers. When the electrically conductive fibers are connected to each other, the fibers will cooperate on the conduction of a possible lightning current to prevent the current from running in individual fibers. Simultaneously the metallic receptor will serve as the primary lightning capturing device and reduce the risk of lightning striking the laminate. The receptor being connected to the lightning arrester, the current will predominately be conducted to ground, while the risk of transfer to the laminate is minimized in that a possible difference in potential between fibers and lightning arrester has been equalized.

18 Claims, 7 Drawing Sheets

METHOD OF LIGHTNING-PROOFING A BLADE FOR A WIND-ENERGY PLANT, A LIGHTNING-PROOFED BLADE AND A WIND-ENERGY PLANT COMPRISING SUCH BLADE

The invention relates to a method of lightning-proofing a blade of a wind-energy plant, which blade comprises a blade shell configured essentially as a fibre-reinforced laminate, which laminate comprises electrically conductive fibres, where the blade comprises at least one lightning arrester configured for conducting a lightning current, including preferably to ground. Also, the invention relates to a lightning-proofed blade and a wind-energy plant.

It is known to provide blades for wind-energy plants with lightning receptors that are, inside the blade, in electric connection with a metallic lightning arrester that is able to connect a lightning current to earth. One example of this was described in EP 0 783 629 B1 which is incorporated herein by this reference. Moreover it is known from WO 00/14405 to use carbon fibres in the laminate of a blade for a wind-energy plant. That disclosure, too, is included herein for reference. WO 00/14405 discloses a solution in which a number of electrically conductive connections are provided in the longitudinal direction of the blade and between carbon-fibre strips in the blade laminate and inwards towards the internal lightning conductor of the blade.

As the demand for blades for wind-energy plants tends towards blades of increasing lengths, a need concurrently arises for manufacture of blades having increased rigidity and a comparatively lower weight. One way of achieving these properties it to combine various types of fibres in the laminate of the blades, for instance it is an option to combine glass fibres and carbon fibres, and likewise carbon fibres or glass fibres may advantageously be combined with steel fibres as known eg from US 20020037409. Combinations with other types of fibres are thus also possible and it is also an option to exclusively employ carbon fibres or other suitable fibre type. Combination of eg glass fibres with carbon fibres in a so-called hybrid laminate presents advantages, but still problems do arise. One of these problems is that some of the fibre types are electrically conductive, eg carbon fibres and steel fibres. A lightning strike directly into the laminate may cause damage to a blade comprising electrically conductive fibres, as they would conduct the current and hereby ia be greatly heated. This is particularly problematic in case of fibres having comparatively poor conductivity, such as carbon fibres, and in case of hybrid laminates with fibres in eg mat-shape, where the individual mat may eg have a small portion of electrically conductive fibres and a larger portion of eg glass fibres that are not electrically conductive. A further issue is that, albeit a lightning current is captured by a receptor and conducted to a lightning arrester, the conductive fibres in the laminate may cause the current to transfer into the laminate and hence cause damage thereto.

A method according to the invention may at least partially remedy the above-described problems, in that the electrically conductive fibres are connected to each other by electrically conductive means; and at least one metallic receptor is provided for capturing lightning current at or in proximity of the external surface of the blade; and the receptor is connected to the lightning arrester; and that a number of the electrically conductive fibres in the laminate are, either via the electrically conductive means or directly—or by a combination thereof, connected to the lightning arrester for evening out the difference in potential between the lightning arrester and the electrically conductive fibres.

When the electrically conductive fibres are connected to each other by electrically conductive means, the fibres will cooperate on the conduction of a lightning current, if any, whereby the current will not be caused to travel in individual fibres. Hereby any damaging effect will be reduced. Simultaneously, the metallic receptor will serve as the primary lightning capturing device and reduce the risk of lightning strikes in the laminate. The receptor being connected to the lighting arrestor, the lightning current will predominately be earthed, while the risk of transfers to the laminate is minimised in that the electrically conductive fibres, being for the major part connected to each other, are also connected to the lightning arrester whereby any difference in potential that may give rise to transfer is thereby equalised. The risk of lightning striking the laminate or transferring to the laminate from the lightning arrestor is thus minimised.

According to one embodiment the receptor can be connected both to the lightning arrestor and to the electrically conductive fibres in the laminate, either via the electrically conductive means or directly or by a combination thereof. Hereby the receptor, which must always be of a sturdy configuration for conducting a lightning current, can also be used for connecting the conductive fibres in the laminate by means of the lightning conductor. Hereby a powerful current can also be conducted from the conductive fibres to the lightning arrester.

According to a further embodiment, the receptor can be connected to the electrically conductive fibres in the laminate by a process that comprises welding, soldering or gluing by electrically conductive glue, eg silver glue. Hereby a safe electrical connection is accomplished that can be configured for conduction of powerful currents.

According to yet an embodiment at least one essentially massive first connecting element of metal can be arranged internally of the blade on top of the electrically conductive means and in electrically conductive connection therewith, said connecting element being connected to the lightning arrestor. Hereby a suitable electrical connection is accomplished, where powerful currents can be conducted from the electrically conductive means to the lightning arrester.

According to a further embodiment at least one further essentially massive connecting element of metal can be arranged against the laminate, and the electrically conductive means are arranged on top of the second connecting element, and the first connecting element is arranged on top of the electrically conductive means, and the first connecting element and the receptor are configured for being clamped to each other through the second connecting element and the electrically conductive means by threads. Hereby it is accomplished that the first and the second connecting elements can be clamped around the electrically conductive means by means of the receptor, whereby good electrical connection is created from the electrically conductive means to the connecting elements.

According to yet an embodiment the first connecting element and/or the second connecting element can be soldered, welded or glued with electrically conductive glue to the electrically conductive means for further improvement of the conductivity.

According to yet an embodiment the laminate may both comprise fibres that are electrically conductive and fibres that are not electrically conductive. Hereby the fibre composition can be optimised in relation to the design of the blade and the load on the blade, since one may freely select fibres from both categories.

According to an alternative embodiment the receptor can be moulded completely or partially into the laminate, including eg in connection with vacuum-injection of resin for bonding the laminate. Hereby processing of the blade is avoided following setting for mounting of the receptor.

According to a preferred embodiment the electrically conductive means may comprise electrically conductive fibres, including in the form of at least one mat. This is advantageous in that, usually, such fibres are already employed in the laminate, and thus they are readily available. Moreover the fibres can be laminated to each other, and a strength contribution there from can be used to advantage, if so desired.

According to an alternative embodiment the electrically conductive means may comprise at least a grid or a plate of metal. Hereby good conductivity is accomplished of the conductive means that are thus suitable for conducting powerful currents.

According to yet an alternative embodiment a number of elongate metal elements can be arranged at the exterior surface of the blade for capturing lightning current and connected to the lightning arrester. Hereby increased reliability is accomplished that a lightning current is captured and conduction of it to the lightning arrester without the laminate being influenced or damaged.

According to yet an embodiment, it is possible to arrange a number of receptors—both at the top surface and at the bottom surface of the blade, whereby increased reliability is accomplished that a lightning current is captured by a receptor. This may be advantageous in particular in case of long blades.

According to a preferred embodiment, the receptors can be arranged approximately symmetrically about an axis, which axis—seen in a cross section of the blade, essentially at right angles to the longitudinal axis of the blade from root to tip—extends through the fore edge and aft edge of the blade. Hereby advantageous distribution of the receptors is accomplished thereby increasing the likelihood of a lightning current being captured.

According to an alternative embodiment, the at least one receptor can be configured to be elongate and adapted for integration into or with the fore and/or aft edge(s) of the blade. Hereby it is possible to configure the receptor or receptors with a comparatively large surface thereby increasing the likelihood of a lightning current being captured.

Such elongate receptor following the longitudinal direction of the blade, the receptor can be used as lightning arrester, at least along a part of the length of the blade. Hereby it is possible to avoid cumbersome mounting of electrical connections interiorly of the blade from receptor(s) to an internal lightning arrester.

According to a preferred embodiment, the at least one receptor can preferably be arranged at that part of the blade shell that is not constituted by the principal laminate of the blade, and preferably in a position in proximity of the principal laminate. Hereby it is avoided the principal laminate is weakened—eg by through-bores, and the receptor can be arranged in the remaining part of the blade shell instead, which is less important from a strength point of view. When arranged in such close proximity to the principal laminate which is where the electrically conductive fibres will preferably be used since, typically, they have a higher strength and rigidity than the other fibres, the protection of the principal laminate is enhanced due to the short distance to the receptor According to yet a preferred embodiment, the at least one receptor can preferably be arranged such that at least a part of the receptor is arranged in proximity of or at the external surface of the blade. Hereby an improved likelihood is achieved of the lightning currents being captured, since such rather free arrangement is more easily "detected" by a lightning.

A further aspect of the invention relates to a wind-energy plant comprising at least one lightning-proofed blade, which blade is manufactured according to a method according to one or more of the above aspects. A further aspect relates to a lightning-proofed blade, which blade is also manufactured according to a method according to one or more of the above aspects. In both cases corresponding advantages are accomplished that are disclosed in respective teachings above.

In the following the invention is disclosed in further detail by means of figures that illustrate exemplary embodiments of the invention:

Figure 1:
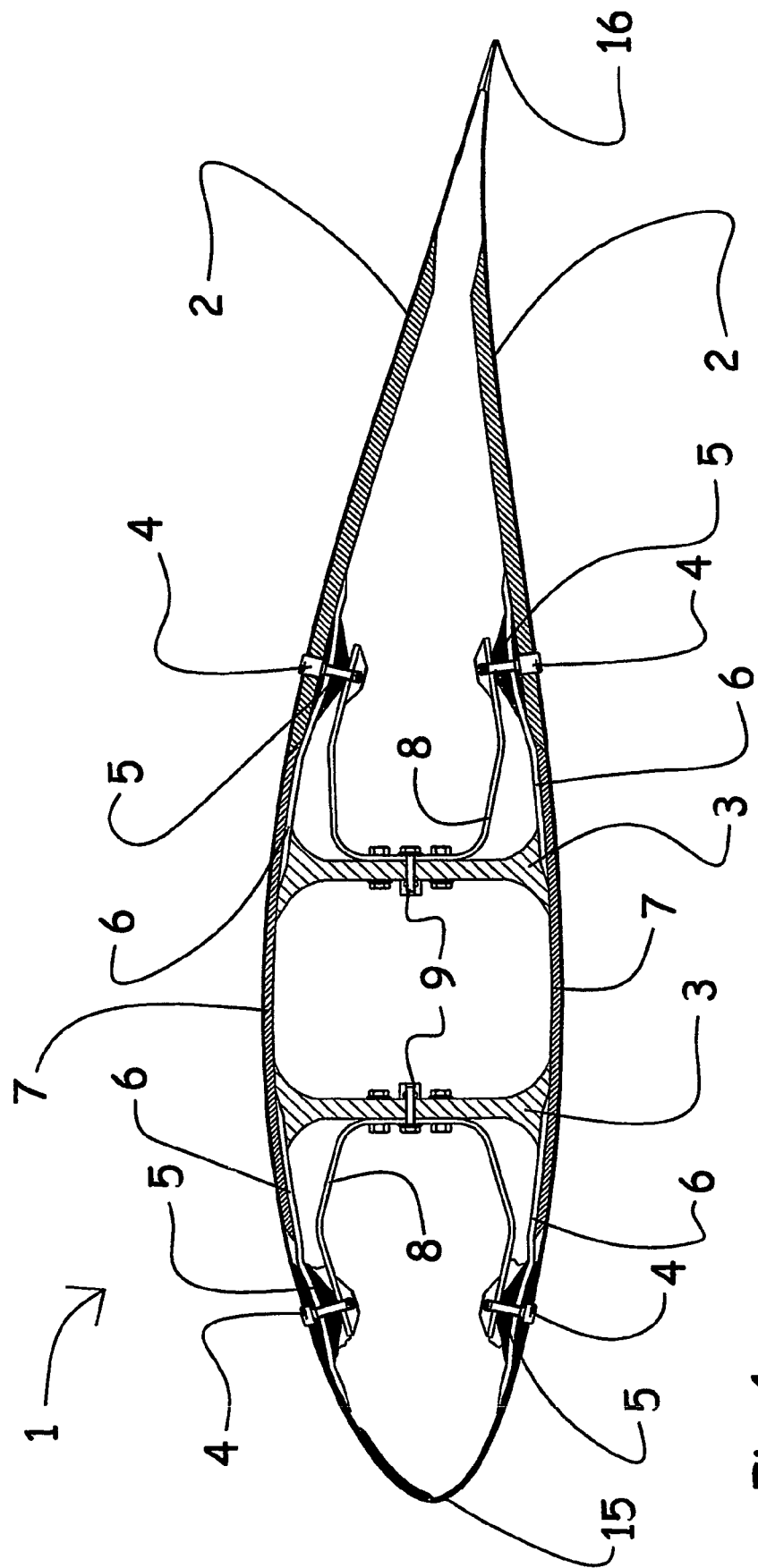
FIG. 1 is a cross-sectional view of a blade of a wind-energy plant.

FIG. 1 shows a blade 1 for a wind-energy plant. The blade 1 comprises a blade shell 2 that ia constitutes the aerodynamically active part of the blade. The blade shell 2 comprises upper principal laminates 7, by which the essential part of the strength and rigidity of the blade are achieved. Internally of the blade, two essentially longitudinally extending beams 3 are arranged for bracing purposes. The fore edge and the aft edge of the blade are indicated by reference numerals 15 and 16, respectively. As a part of the lightning-proofing measures of the shown blade 1, metallic receptors 4 are provided at the exterior surface of the blade shell 2. The term "receptor" is to be understood an electrically conductive object being configured with a view to capturing and conducting a lightning current. Via connections 8 the receptors 4 are connected to lightning arresters 9. Receptors 4, connections 8 and arresters 9 are metallic objects configured for being able to conduct a lightning current that may be extremely powerful. The lightning current must be conducted reliably from the lightning currents 9 to a ground connection, including optionally across a spark gap since otherwise the current may damage the blade. The receptors 4 are connected to connections 8 by terminals 5 that are configured for reliably transferring a lightning current from the receptor 4 to the connection 8. In that blade 1, the principal laminates 7 comprise not shown electrically conductive fibres, such as carbon fibres, steel fibres, etch. Electrically conductive means 6 are arranged that are connected to a large portion of the conductive fibres in principal laminates, and being in the shown case connected to a lightning arrester 9 via a receptor 4 and a connection 8. This is a practical embodiment, the receptor being already connected to the lightning arrestor 9; however, the conductive means 6 may also be connected to a lightning arrestor in some other manner. When the conductive means 6 and hence the conductive fibres are connected to the lightning arrester 6, the fibres, the conductive means and the lightning arrester will have the same potential, thereby at least reducing the risk of a lightning current in the lightning arrestor transferring to the fibres of the laminate 7. As will appear from FIG. 1, the receptors 4 are preferably arranged next to the principal laminates 7 so as not to compromise the strength thereof. The number and location of the receptors 4 are selected to be in accordance with the dimensions of the blade 1.

Figure 2:
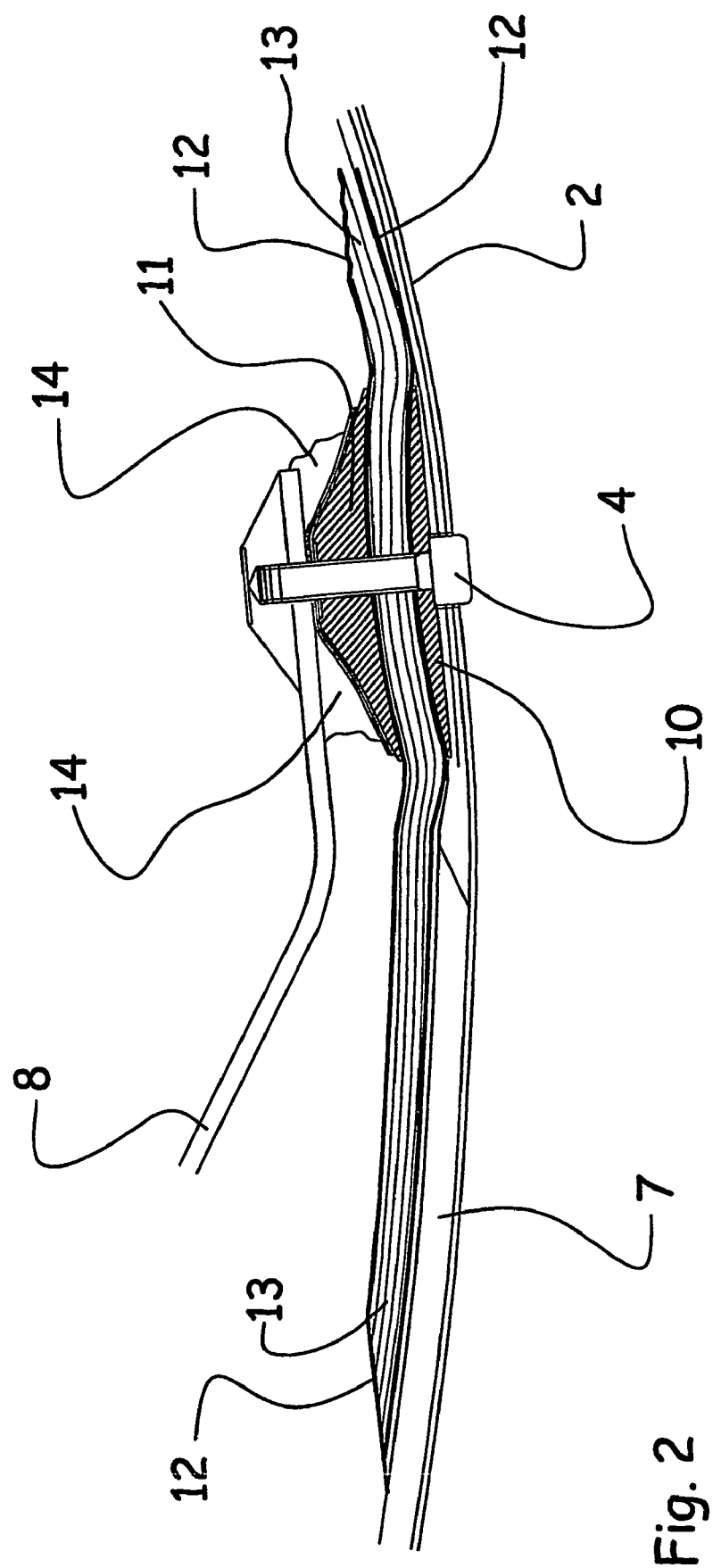
FIG. 2 shows a section of a cross-section of a blade.

FIG. 2 shows a blade shell 2 comprising a principal laminate 7, wherein not shown electrically conductive fibres are shown. Next to the principal laminate 7, a cylindrical receptor 4 is provided. Internally of the blade shell 2, a metallic connecting element 10 is arranged that may be secured by means of glue. On top of the connecting element 10, a heavy grid 12 of cupper is provided: the grid 12 is conveyed across a part of the principal laminate 7 where it is in contact with the not shown electrically conductive fibres—either directly or by means of not shown electrically conductive means. On top of the grid 12, a number of mats 13 are arranged that may be of carbon fibres or other suitable material, and yet a grid of cupper. On top of the layers of grid 12 and mats 13, yet a metallic connecting element 11 provided with thread is arranged. The receptor 4 is also configured with threads for cooperating with the connecting element 11 through the connecting element 10, grid 12 and mats 13. In this embodiment clamping together of the receptor 4 and the connecting element 11 can be used to clamp the connecting elements 10, 11 tightly around grid 12 and mats 13, whereby good electrical connection is achieved. This can be further improved and ensured by soldering the grids 12 to the respective connecting elements 10 and 11. Moreover, the receptor 4 is connected to a connection 8 for earthing. To improve securing of connection 8, it is arranged in a gluing 14. The metallic connecting elements 10 and 11 can be configured of eg a bronze-alloy; but other metals may also be used. The same applies to grids 12 and mats 13; the essential being good electrical conductivity.

Figure 3:
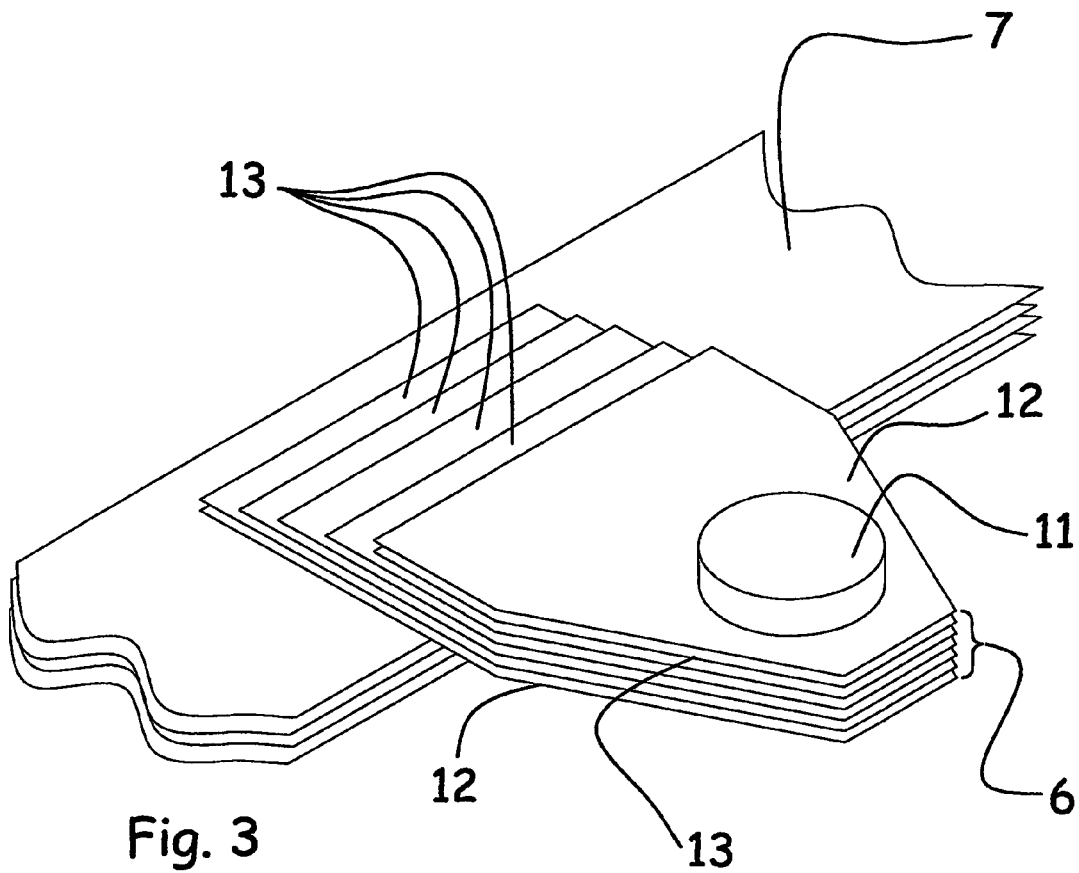
FIG. 3 is an isometric view of a section of interior details of a blade.

FIG. 3 shows an exemplified embodiment of mats 13 and grids 12, wherein they are stepped up in thickness and narrowed in width in the course from the laminate 7 towards the connecting element 11. The one grid 12 is arranged in contact with not shown electrically conductive fibres in the laminate 7, and the grids 12 and the mats 13 thus constitute electrically conductive means 6 that also connect the conductive fibres to each other.

Figure 4:
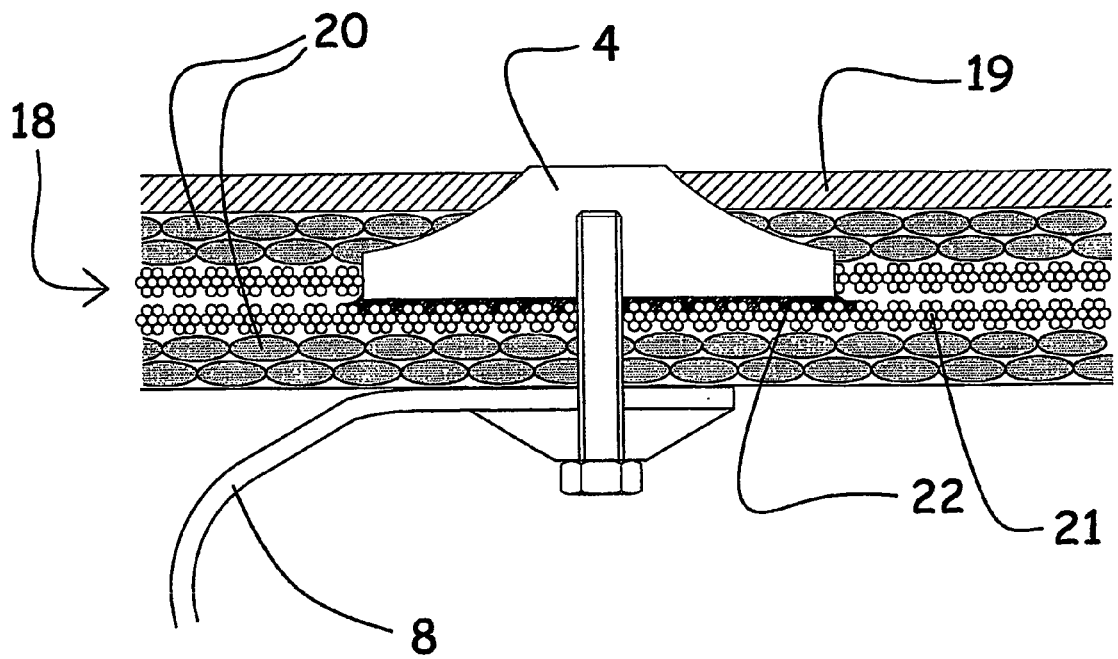
FIG. 4 is a section of a cross section of a blade.

FIG. 4 shows a receptor 4 cast integrally with a laminate for a blade. Exteriorly a layer of gel coat 10 is provided. The laminate comprises electrically non-conductive fibres 20 in mat-shape and electrically conductive fibres 21 arranged in mats 18. Both fibres 20 and fibres 21 are arranged in batches 18, wherein the binding ensures electrically conductive connection between all of the fibres, albeit they are situated essentially in parallel. The receptor 4 is connected to the fibres 21 by electrically conductive glue 22. A connection 8 is coupled to a not shown lightning arrester for earthing and by means of a screw it is connected to the receptor 4, whereby both receptor 4 and electrically conductive fibres 21 are connected to ground. The shown fibre mats may conveniently be the so-called hybrid mats that are structured in a pattern with at least one roving of one type of fibre and at least one roving of another type of fibre. For instance, the fibres 20 can have a pattern of alternately seven rovings of glass fibres and one roving of carbon fibres. At the top and/or bottom side(s) of such hybrid mat electrically conductive means are arranged, eg in the form of electrically conductive fibres, eg carbon fibres, for creating an electrical connection and equalisation of potential between the fibres. Alternatively, the electrically conductive means can be a metal grid or a metal plate or the like. Fibres 21 may be steel fibres.

Figure 5:
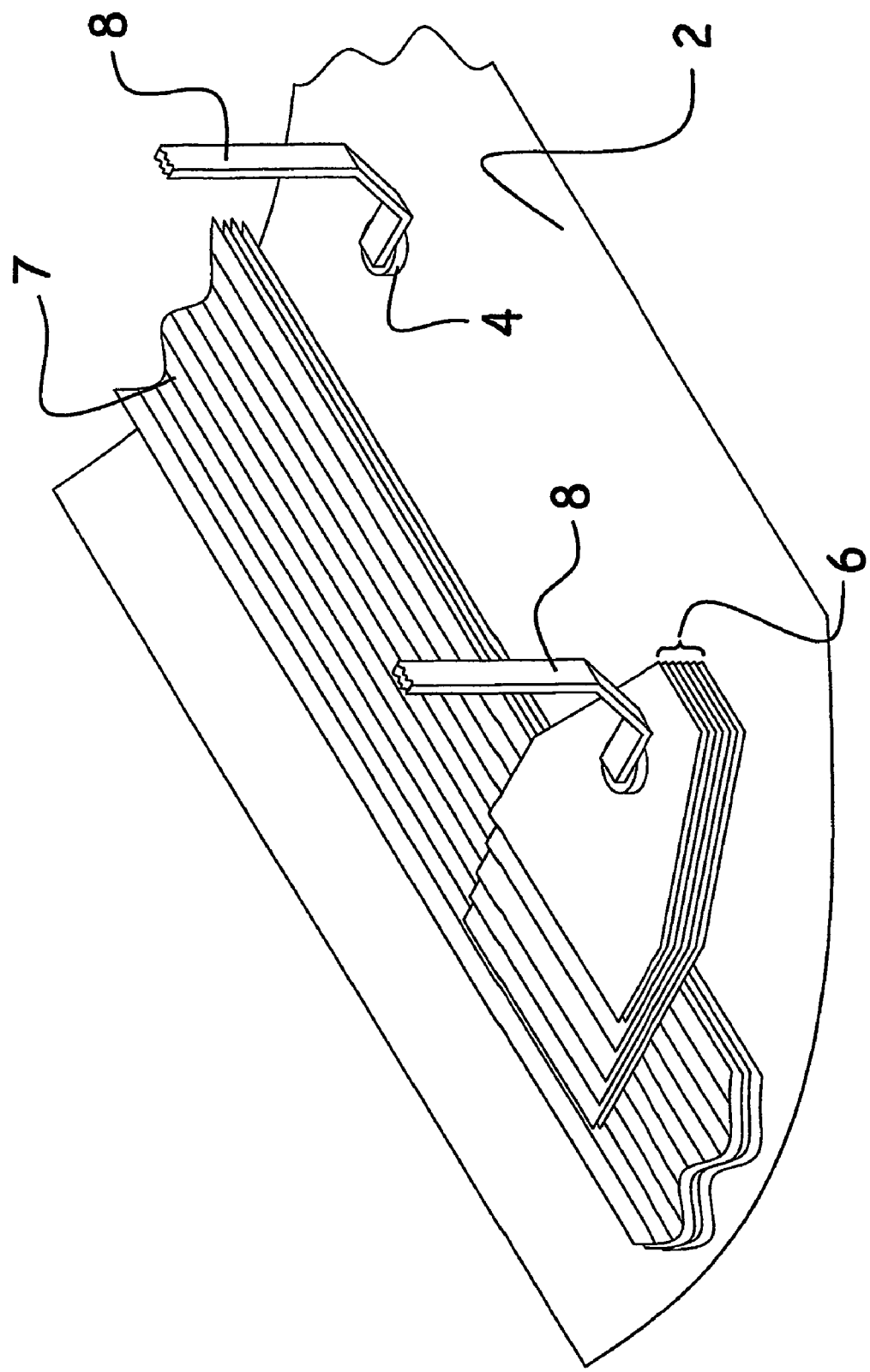
FIG. 5 is an isometric view of a section of interior details of a blade.

FIG. 5 shows a blade shell 2 comprising a laminate 7 that contains not shown electrically conductive fibres, said fibres being electrically connected via electrically conductive means 6 from where they are coupled to a connection 8. In the blade shell 2, a receptor 4 is arranged that is connected to a connection 8. Both connections 8 are connected to ground.

Figure 6:
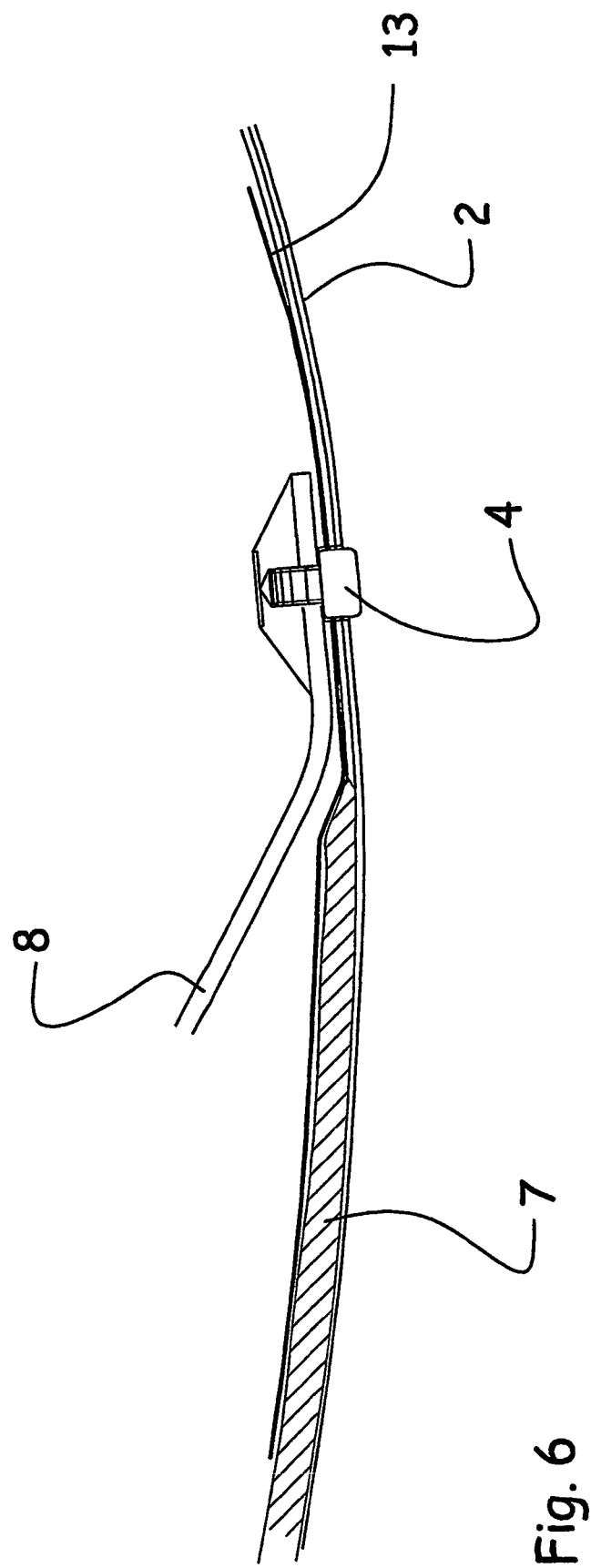
FIG. 6 shows a section of a cross section of a blade.

FIG. 6 shows a blade shell 2, wherein a receptor 4 is arranged for capturing lightnings at the outside at the outside thereof, and wherein the receptor is arranged in that part of the blade shell that is not constituted by the principal laminate 7. Via a connection 8, the receptor 4 is connected to ground. Not shown electrically conductive fibres in the laminate 7 are connected to a grid 13 of metal and likewise connected to the connection 8. Preferably the grid can be glued to the laminate.

Figure 7:
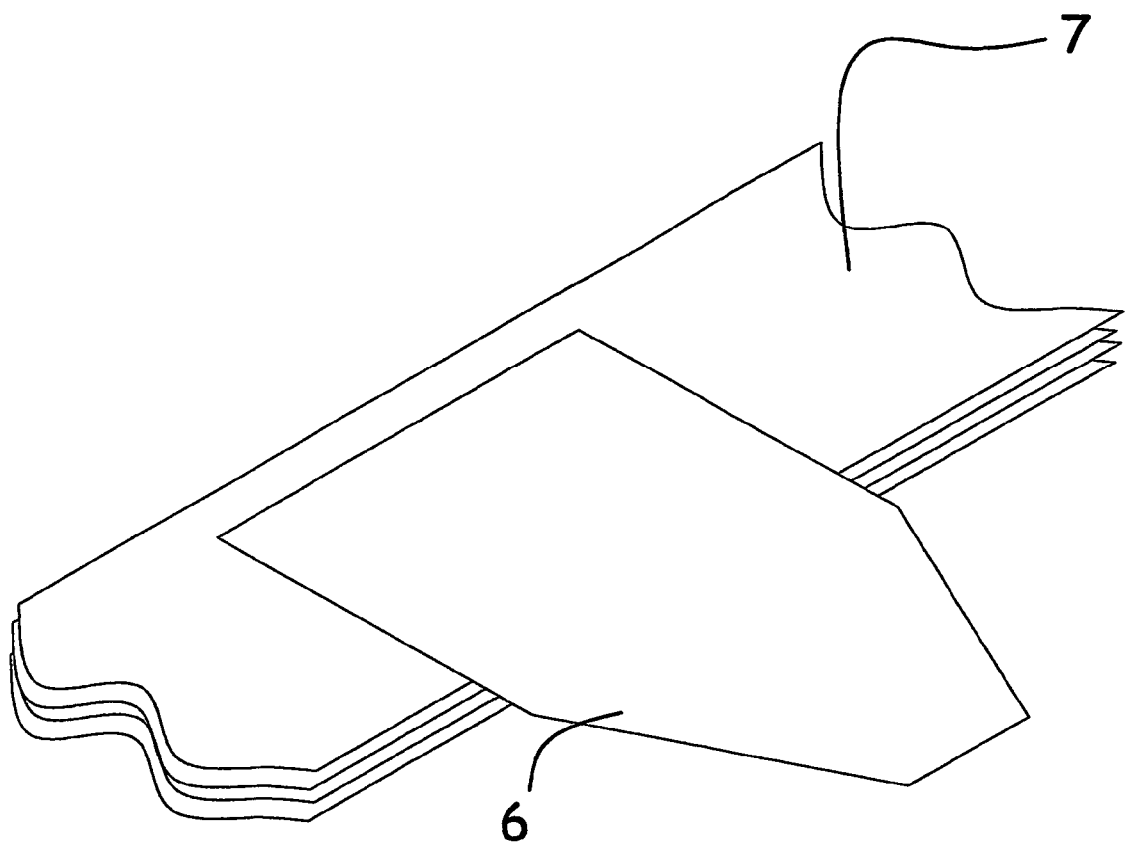
FIG. 7 is an isometric view of a section of interior details of a blade.

FIG. 7 shows a principal laminate 7 containing at least a portion of not shown electrically conductive fibres, eg in the form of at least one hybrid mat, wherein the fibres are connected to electrically conductive means 6. The means 6 can be a grid, a mat or a plate and configured essentially of an electrically conductive material. The electrically conductive fibres can be cross-connected by electrically conductive means throughout the entire length of the blade or in sections.

Figure 8:
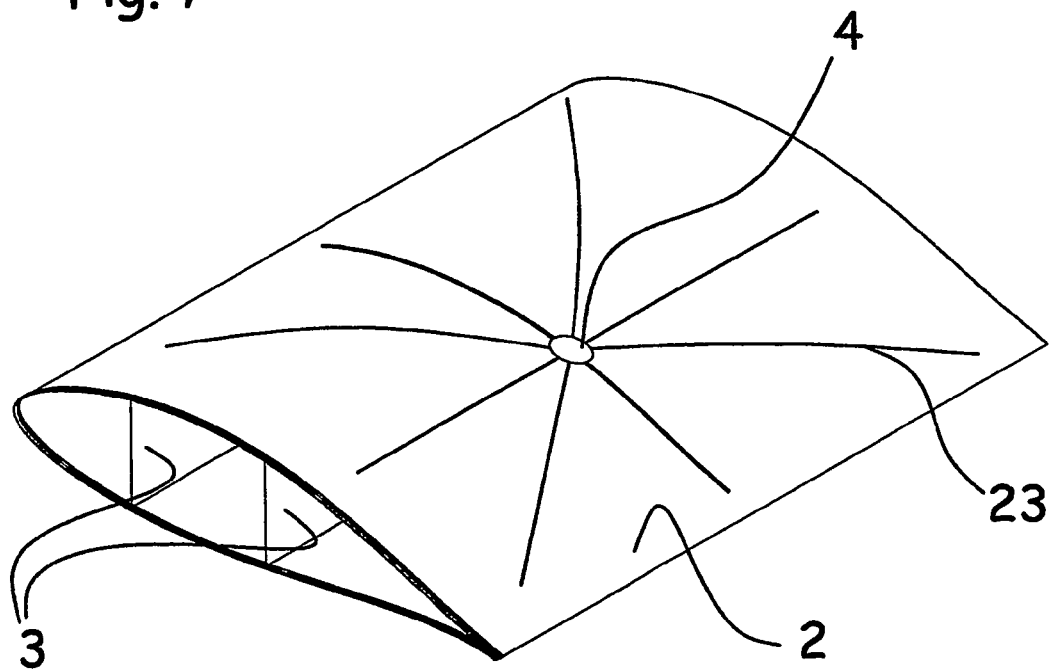
FIG. 8 is an isometric view of a section of a blade.

FIG. 8 shows a blade shell 2 with internal bracings in the form of beams 3. Exteriorly of the blade shell 2, elongate metal members 23 are arranged—the so-called diverter strips—that are connected to a receptor 4. Hereby great area coverage of the surface is accomplished by means of relatively few receptors 4, which may be advantageous in case of large blades. The metal objects 23 can be secured by gluing or cast integrally.

Figure 9:
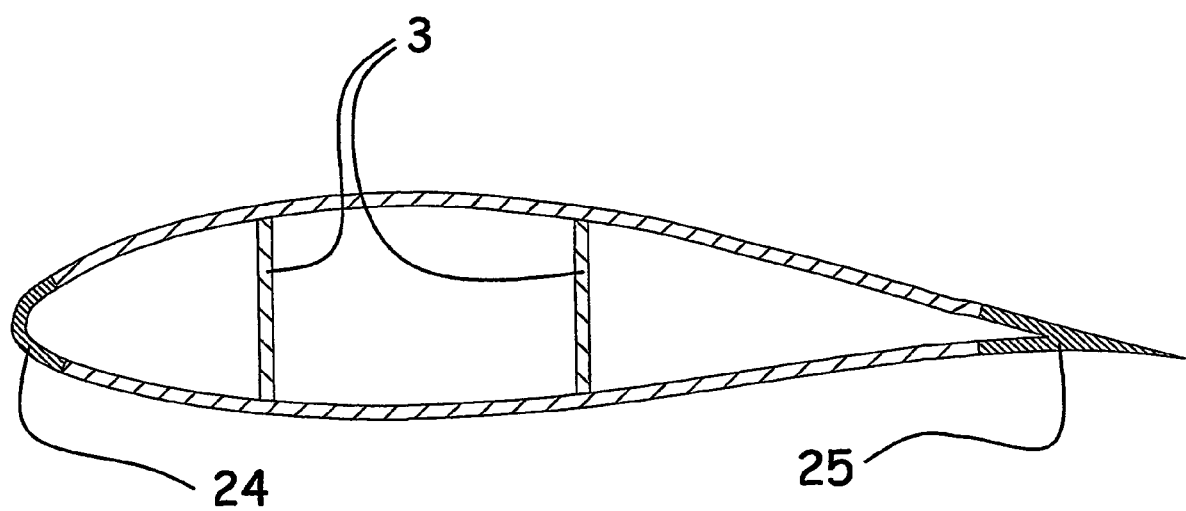
FIG. 9 shows a cross section through a blade.

FIG. 9 shows bracing beams 3 and receptors 24 and 25 that can be integral with the fore edge and/or the aft edge of the blade and will have an expanse corresponding at least to half the length of the blade.

It will be understood that the invention as disclosed in the present description and figures can be modified or changes while continuing to be comprised by the scope of protection of the following claims.

The invention claimed is:

1. A method of lightning-proofing a blade (1) of a wind-energy plant, which blade comprises a blade shell (2) configured essentially as one or more fiber-reinforced laminate parts (7; 18), said laminate parts comprising electrically conductive fibres (21), wherein the blade comprises at least one lightning arrester (9) configured for conducting lightning current, including preferably to ground, characterized in that at least a number of electrically conductive fibres within the same laminate part are connected to each other by electrically conductive means (6, 12, 13); and that at least one metallic receptor (4, 24, 25) is provided for capturing lightning current at or in proximity of the external surface of the blade; and that the receptor is connected to the lightning arrester; and that a number of the electrically conductive fibres within the same laminate part are via the electrically conductive means connected to the lightning arrestor for equalizing the difference in potential between the lightning arrester and the electrically conductive fibres wherein at least one essentially massive first connecting element (11) of metal is arranged internally in the blade on top of the electrically conductive means and in electrically conductive connection there with, said connecting element being connected to the lightning arrester.

2. A method according to claim 1, wherein the receptor is connected both to the lightning arrester and to the electrically conductive fibres in the laminate, either via the electrically conductive means or directly by a combination thereof.

3. A method according to claim 1, wherein the receptor is connected to the electrically conductive fibres in the laminate by a process that comprises welding, soldering or gluing with electrically conductive glue, egg silver glue.

4. A method according to claim 1, wherein at least one second essentially massive connecting element (10) of metal is arranged in abutment against the laminate; and the electrically conductive means are arranged on top of the further connecting element; and the first connecting element (11) is arranged on top of the electrically conductive means; and that the first connecting element and the receptor are configured for being clamped to each other through the second connecting element and the electrically conductive means by means of thread.

5. A method according to claim 4, wherein the first connecting element and/or the second connecting element is/are soldered, welded or glued with electrically conductive glue to the electrically conductive means.

6. A method according to claim 1, wherein the laminate both comprises fibres that are electrically conductive and fibres (20) that are not electrically conductive.

7. A method according to claim 1, wherein the receptor is cast completely or partially integral with the laminate with vacuum-injection of resin for bonding the laminate.

8. A method according to claim 1, wherein the electrically conductive means comprise electrically conductive fibres in the form of at least one mat.

9. A method according to claim 1, wherein the electrically conductive means comprise at least a grid or a plate of metal.

10. A method according to claim 1, wherein a number of elongate metal elements (23) are arranged at the external surface of the blade for capturing lightning current and are connected to the lightning arrester.

11. A method according to claim 1, wherein a number of receptors are arranged both at the upper side and the lower side of the blade.

12. A method according to claim 11, wherein the receptors are arranged approximately symmetrically about an axis, said axis, seen in a cross sectional view of the blade essentially at right angles to the longitudinal axis of the blade from root to tip, extending through the fore edge (15) and the aft edge (16) of the blade.

13. A method according to claim 1, wherein the at least one receptor is configured to be elongate and adapted for integration into or with the fore and/or aft edges of the blade.

14. A method according to claim 13, wherein the receptor is used as lightning arrester at least on a part of the length of the blade.

15. A method according to claim 1, wherein the at least one receptor is preferably used at that part of the blade shell that is not constituted of the principal laminate of the blade, and preferably in a position in proximity of the principal laminate.

16. A method according to claim 1, wherein the at least one receptor is preferably arranged such that at least a part of the receptor is arranged in proximity of or at the external face of the blade.

17. A wind-energy plant comprising at least one lightning-proofed blade (1), which blade comprises a blade shell (2) configured essentially as one or more fiber-reinforced laminate parts (7, 18), which laminate parts comprise electrically conductive fibres (21), where the blade comprises at least one lightning arrester (9) configured for conducting lightning current, including preferably to ground, wherein at least a number of the electrically conductive fibres within the same laminate part are connected to each other by electrically conductive means (6, 12, 13), and wherein at least one metallic receptor (4, 24, 25) is arranged for capturing lightning current at or in proximity of the external face of the blade, and wherein the receptor is connected to the lightning arrester, for equalising difference in potential between the lightning arrester and the electrically conductive fibres; and wherein at least one essentially massive first connecting element (11) of metal is arranged internally in the blade on top of the electrically conductive means and in electrically conductive connection there with, said connecting element being connected to the lightning arrester.

18. A lightning-proofed blade (1) for a wind-energy plant, said blade comprising a blade shell (2) configured essentially as one or more fibre-reinforced laminate parts (7, 18), which laminate parts comprise electrically conductive fibres (21), wherein the blade comprises at least one lightning arrester (9) configured for conducting lightning current, including preferably to ground, wherein at least a number of the electrically conductive fibres within the same laminate part are connected to each other by electrically conductive means (6, 12, 13), and wherein at least one metallic receptor (4, 24, 25) is arranged for capturing lightning current at or in proximity of the external surface of the blade, and wherein the receptor is connected to the lightning arrester, for equalising the difference in potential between the lightning arrester and the electrically conductive fibres; and wherein at least one essentially massive first connecting element (11) of metal is arranged internally in the blade on top of the electrically conductive means and in electrically conductive connection there with, said connecting element being connected to the lightning arrester.

\* \* \* \* \*